United States Patent
Ffrench

(10) Patent No.: US 9,697,047 B2
(45) Date of Patent: Jul. 4, 2017

(54) COOPERATION OF HOARDING MEMORY ALLOCATORS IN A MULTI-PROCESS SYSTEM

(71) Applicant: International Business Machines Corporation, Armonk, NY (US)

(72) Inventor: Anthony Ffrench, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/626,022

(22) Filed: Sep. 25, 2012

(65) Prior Publication Data
US 2014/0089624 A1  Mar. 27, 2014

(51) Int. Cl.
 *G06F 12/02* (2006.01)
 *G06F 9/50* (2006.01)

(52) U.S. Cl.
 CPC .................. *G06F 9/5016* (2013.01)

(58) Field of Classification Search
 CPC .. G06F 12/0246; G06F 12/0223; G06F 12/14; G06F 9/5016; G06F 9/4881; G06F 12/023; G06F 12/0897; G06F 12/0238; G06F 12/0866; G06F 12/0888; G06F 12/0891; G06F 12/1009; G06F 2009/45583; G06F 2212/1041; G06F 3/0631; G06F 2209/5018
 USPC .................. 711/150, 154, 147, 170
 See application file for complete search history.

(56) References Cited

U.S. PATENT DOCUMENTS

| | | | |
|---|---|---|---|
| 6,539,464 B1 * | 3/2003 | Getov | G06F 9/5016 711/147 |
| 6,804,766 B1 * | 10/2004 | Noel et al. | 711/203 |
| 7,007,150 B2 * | 2/2006 | Valentin | G06F 9/5016 711/147 |
| 7,337,296 B2 * | 2/2008 | Noel et al. | 711/170 |
| 8,225,065 B2 * | 7/2012 | Reynya | G06F 12/023 711/170 |

(Continued)

OTHER PUBLICATIONS

Simon Kahan and Petr Konecny. 2006. "MAMA!": A Memory Allocator for Multithreaded Architectures. In Proceedings of the eleventh ACM SIGPLAN symposium on Principles and practice of parallel programming (PPoPP '06). ACM, New York, NY, USA, 178-186.*

(Continued)

*Primary Examiner* — Prasith Thammavong
*Assistant Examiner* — Alex Olson
(74) *Attorney, Agent, or Firm* — Ian A. McKee; David M. Quinn; Isaac J. Gooshaw

(57) ABSTRACT

A second memory allocator receives a request to allocate memory from a second process of the second memory allocator executing on a computer, and determines that memory for allocation to the second process is not available from a memory hoard of the second memory allocator. The second memory allocator determines that memory for allocation to the second process is not available from an operating system of the computer, and transmits the request to release memory to a first memory allocator. The first memory allocator of a first process executing on the computer receives the request from the second memory allocator executing on the computer to release memory. Responsive to the request from the second memory allocator to release memory, the first memory allocator releases hoarded memory previously hoarded for allocation to the first process.

20 Claims, 5 Drawing Sheets

(56) References Cited

U.S. PATENT DOCUMENTS

| | | | |
|---|---|---|---|
| 8,291,426 B2* | 10/2012 | Gustafsson et al. | 718/104 |
| 8,656,077 B2* | 2/2014 | Miloushev et al. | 710/104 |
| 2003/0009635 A1* | 1/2003 | Arimilli et al. | 711/141 |
| 2003/0196062 A1* | 10/2003 | Valentin | G06F 9/5016 711/170 |
| 2005/0050295 A1* | 3/2005 | Noel et al. | 711/206 |
| 2008/0104358 A1* | 5/2008 | Noel et al. | 711/170 |
| 2009/0300638 A1* | 12/2009 | Gustafsson et al. | 718/104 |
| 2011/0202927 A1* | 8/2011 | Miloushev et al. | 718/104 |
| 2012/0124305 A1* | 5/2012 | Weissman | G06F 12/0223 711/160 |
| 2013/0159638 A1* | 6/2013 | Koinuma | G06F 12/1441 711/154 |

OTHER PUBLICATIONS

Berger et 2000 al.; "Hoard: A Scalable Memory Allocator for Multithreaded Applications"; ASPLOS 2000; Cambridge, MA; Copyright 2000.*

Tanenbaum, Andrews S., "Structured Computer Organization", ©1984, Prentice-Hall, Inc., pp. 10-12.*

Berger et al.; "Hoard: A Scalable Memory Allocator for Multithreaded Applications"; ASPLOS 2000; Cambridge, MA; Copyright 2000.

* cited by examiner

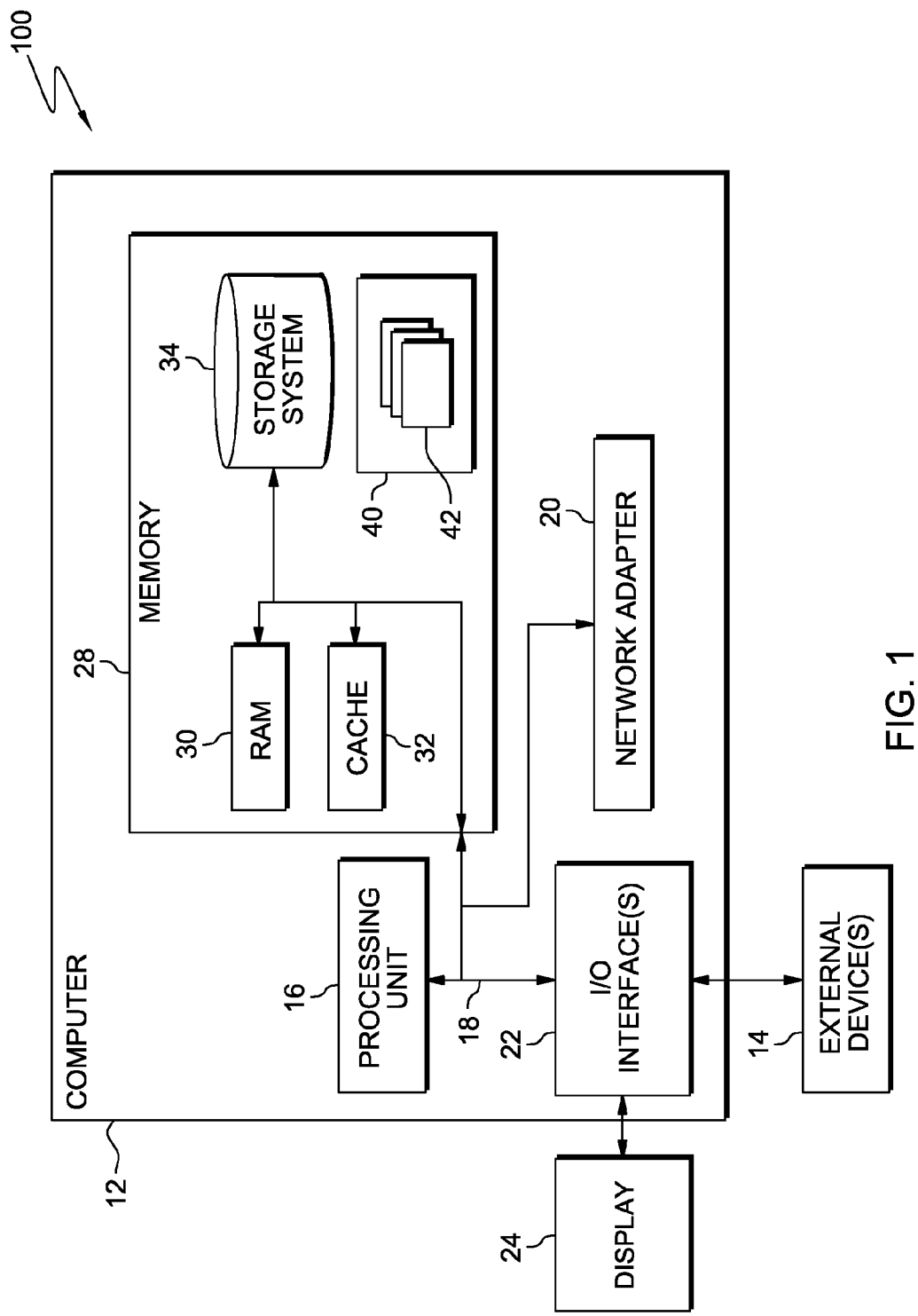

COOPERATION OF HOARDING MEMORY ALLOCATORS IN A MULTI-PROCESS SYSTEM

FIELD OF THE INVENTION

The present invention relates generally to hoarding memory allocators, and more particularly to cooperation of hoarding memory allocators in a multi-process system.

BACKGROUND

Memory management among processes is an important task supported by most modern operating systems. The task of memory management involves several aspects. For example, virtual memory is an important aspect of memory management. Virtual memory essentially provides an alternate set of memory addresses. Processes use virtual addresses rather than physical addresses to store instructions and data. When utilized by a process, the virtual addresses are converted into physical memory addresses.

The basic purpose of virtual memory is to enlarge the address space a process can utilize. For example, virtual memory might contain twice as many addresses as physical memory. A process using all of its virtual memory, therefore, would not be able to fit in physical memory all at once. Nevertheless, the computer could execute such a process by copying into physical memory those portions of the process needed at any given point during process execution.

Another aspect involved in memory management is paging, which facilitates the use of the enlarged address space provided by virtual memory. Where paging is implemented, the operating system divides memory into pages, each of which contains a fixed number of addresses, and moves pages from physical memory to disk while not actively in use by an executing process (this is practical because the storage capacity of disk is typically much larger than the storage capacity of physical memory). Each page moved to disk is stored on disk until it is needed by an executing process. When the page is needed, the operating system copies it from disk to physical memory. By use of the techniques of virtual memory and paging, each process can execute in its own virtual memory space that is apparently much larger than would be possible if the computer system were constrained to using only physical memory without paging.

In addition to increasing the effective size of memory, virtual memory substantially improves the efficiency of physical memory utilization. Specifically, physical addresses only need to be assigned to those virtual addresses of a process that are currently active, such as, those virtual addresses that have been made active to store data into an allocated data structure, or to store a call stack frame. If a process is not using a portion of its assigned virtual address space, then no physical addresses need be reserved for these unused virtual addresses. As a result, a larger portion of physical memory is available for use by other processes which can continue to operate as if they also have a large contiguous available address space.

Another aspect involved in memory management is memory allocation within a process. Processes executing on, for example, Unix-like operating systems use "malloc( )" and its associated family of routines to allocate memory for data structures, and subsequently to free such memory. When called from within a process, malloc( ) requests a block of free memory of a particular size from the operating system. A block may be a portion of a page. In one case, the request can be satisfied by returning to the process the block of memory of the requested size from within a page of physical memory already allocated to the process. However, in another case, if the requested size is larger, then the operating system may have to allocate to the process a page of physical memory not currently allocated to the process, and then return to the process a block of memory of the requested size from within the newly allocated page.

When a malloc( ) family routine is called from within a process to free a block of memory, the operating system receives the request and de-allocates the block of memory associated with the request. If the de-allocation results in a physical page of memory that is entirely unused by the process, such that no blocks are allocated from within the physical page of memory, then the physical page can be de-allocated from the process, for later allocation to other processes.

SUMMARY

Embodiments of the present invention provide for a program product, system, and method in which a second memory allocator receives a request to allocate memory from a second process of the second memory allocator executing on a computer, and determines that memory for allocation to the second process is not available from a memory hoard of the second memory allocator. The second memory allocator determines that memory for allocation to the second process is not available from an operating system of the computer, and transmits the request to release memory to a first memory allocator. The first memory allocator of a first process executing on the computer receives the request from the second memory allocator executing on the computer to release memory. Responsive to the request from the second memory allocator to release memory, the first memory allocator releases hoarded memory previously hoarded for allocation to the first process.

BRIEF DESCRIPTION OF THE SEVERAL VIEWS OF THE DRAWINGS

FIG. 1 is a functional block diagram of a computer system in accordance with an embodiment of the present invention.

DETAILED DESCRIPTION

Figure 2A:
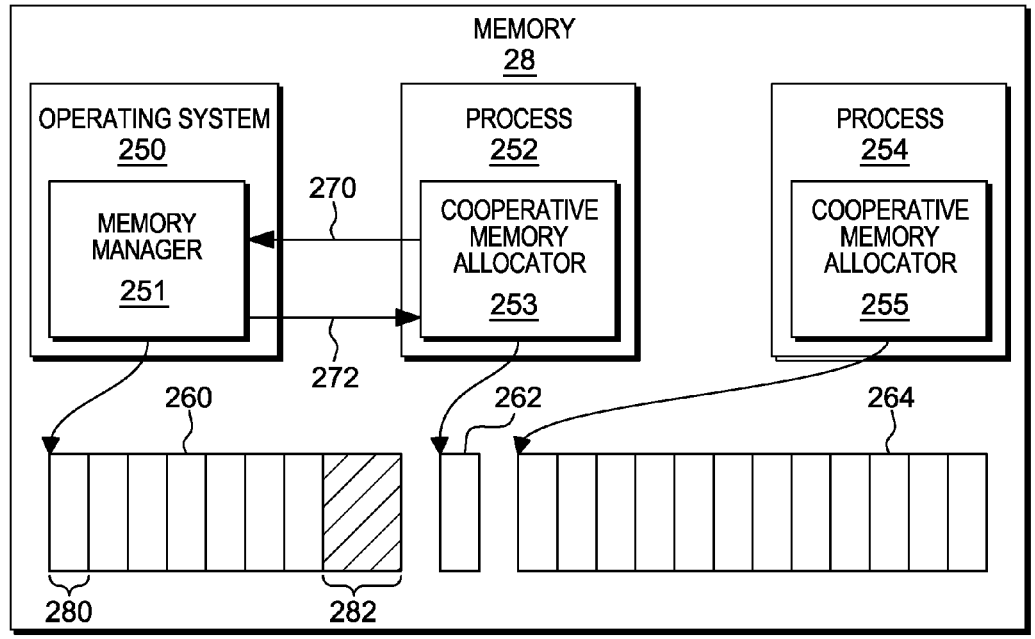
FIGS. 2A and 2B are functional block diagrams of a memory that stores free memory managed by an operating system and hoarded memory associated with two processes, in accordance with an embodiment of the present invention.

The malloc( ) family of routines have particular drawbacks. For example, the malloc( ) family of routines, in freeing memory by releasing the freed memory back to the operating system, suffer from performance issues when performing frequent allocations and de-allocations, because of the high overhead implicated in communicating with the operating system. In response to this drawback, hoarding memory allocators were developed. Hoarding memory allocators can request memory from the operating system in the manner of the malloc( ) family of routines, but can de-allocate memory by setting it aside in a process-local hoard, rather than by giving it back to the operating system. Thus, subsequent allocation requests from within the process can be satisfied from the hoard, without requiring time-consuming requests to the operating system. However, these hoarding memory allocators have particular drawbacks of their own. For example, such hoarding memory allocators, by setting aside freed memory in process-local hoards, can starve the operating system of memory to allocate.

Thus, while the techniques of virtual memory and paging improve the sharing of physical memory among processes, other problems relating to memory allocation remain unresolved by conventional memory management techniques. From the foregoing, it can be appreciated that a need exists for improved memory allocation techniques.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of a computer system in accordance with an embodiment of the present invention is shown. Computer system 100 is only one example of a suitable computer system and is not intended to suggest any limitation as to the scope of use or functionality of embodiments of the invention described herein. Regardless, computer system 100 is capable of being implemented and/or performing any of the functionality set forth hereinabove.

In computer system 100 there is computer 12, which is operational with numerous other general purpose or special purpose computing system environments or configurations. Examples of well-known computing systems, environments, and/or configurations that may be suitable for use with computer 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 12 may be described in the general context of computer system executable instructions, such as program modules, being executed by a computer system. Generally, program modules may include routines, programs, objects, components, logic, data structures, and so on that perform particular tasks or implement particular abstract data types. Computer 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer 12 in computer system 100 is shown in the form of a general-purpose computing device. The components of computer 12 may include, but are not limited to, one or more processors or processing units 16, memory 28, and bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 12 typically includes a variety of computer system readable media. Such media may be any available media that is accessible by computer 12, and includes both volatile and non-volatile media, and removable and non-removable media.

Memory 28 can include computer system readable media in the form of volatile memory, such as random access memory (RAM) 30 and/or cache 32. Computer 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program 40, having one or more program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer 12 may also communicate with one or more external devices 14 such as a keyboard, a pointing device, etc., as well as display 24; one or more devices that enable a user to interact with computer 12; and/or any devices (e.g., network card, modem, etc.) that enable computer 12 to communicate with one or more other computing devices. Such communication can occur via Input/Output (I/O) interfaces 22. Still yet, computer 12 can communicate with one or more networks such as a local area network (LAN), a general wide area network (WAN), and/or a public network (e.g., the Internet) via network adapter 20. As depicted, network adapter 20 communicates with the other components of computer 12 via bus 18. It should be understood that although not shown, other hardware and/or software components could be used in conjunction with computer 12. Examples, include, but are not limited to: microcode, device drivers, redundant processing units, external disk drive arrays, RAID systems, tape drives, and data archival storage systems, etc.

Figure 2B:
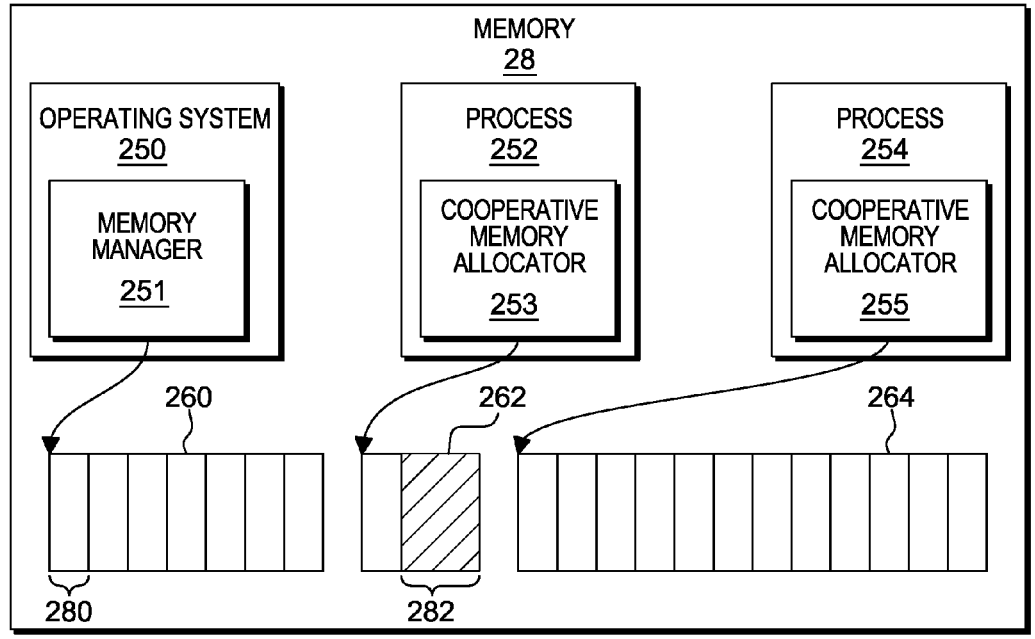

Referring now to FIGS. 2A and 2B, functional block diagrams are shown of memory 28 that stores free memory managed by an operating system and hoarded memory associated with two processes, in accordance with an embodiment of the present invention. In particular, FIG. 2A shows memory 28, that stores free memory 260, hoarded memory 262, and hoarded memory 264, which are each divided into multiple pages. For example, page 280 is marked in FIG. 2A. Although FIG. 2A depicts each of free memory 260, hoarded memory 262, and hoarded memory 264 as a contiguous group of pages, it should be understood that in various embodiments each may be physically discontinuous because of, for example, the effect of virtual memory or paging techniques used by computer 12. Although the present discussion treats memory as being divided into multiple pages, in various other embodiments memory can be divided into multiple blocks, segments, buffers, or other suitable divisions. As also shown in FIG. 2A, memory 28 also stores operating system 250, process 252, and process 254. One or both of processes 252 and 254 can be, for example, program 40 depicted in FIG. 1.

Free memory 260 is managed by memory manager 251 of operating system 250. Memory manager 251 is responsible for allocating one or more pages of free memory 260 to a requesting process when a memory allocator of the process requests it, as well as, for returning one or more pages of freed memory to free memory 260 when a memory allocator of a process frees it. In one embodiment, memory manager 251 maintains a pointer to the first page of free memory 260, as shown in FIG. 2A. It should be understood that although the discussion herein relates to allocating and freeing pages of memory, in various embodiments alternative amounts of memory can be allocated and freed. For example, in one embodiment memory is allocated and freed in arbitrarily-sized numbers of bytes.

In the illustrated instance shown in FIG. 2A, hoarded memory 262 has a single page and is associated with cooperative memory allocator 253 of process 252, whereas hoarded memory 264 has several pages and is associated with cooperative memory allocator 255 of process 254. Hoarded memories 262 and 264 are pages of memory that have previously been allocated to their respective processes by memory manager 251, but that are currently not in use by their respective processes, and that have not been returned to free memory 260. As such, when they receive memory allocation requests from their respective processes 252 and 254, cooperative memory allocators 253 and 255 are able in certain instances to satisfy the requests from within their respective hoarded memories 262 and 264, i.e., without the assistance of memory manager 251. However, if they are not able to satisfy the requests from within their respective hoarded memories 262 and 264, cooperative memory allocators 253 and 255 can still avail themselves of memory manager 251, according to embodiments of the present invention.

For example, as shown in FIG. 2A, cooperative memory allocator 253 has one page of memory in hoarded memory 262. If process 252 makes a new request for memory that cannot be satisfied by the single page of memory in hoarded memory 262, then cooperative memory allocator 253 can send request 270 to memory manager 251, requesting additional pages of memory to satisfy the new request for memory. For example, if process 252 needs three pages of memory to store a new data structure, then cooperative memory allocator 253 can request two pages of memory from memory manager 251.

In response to request 270, memory manager 251 releases pages 282 and sends response 272 to cooperative memory allocator 253, informing cooperative memory allocator 253 of the location of pages 282. In one embodiment, both request 270 and response 272 are made via an operating system interface such as malloc, mmap, or sbrk, or via an interprocess communication technique, such as a shared memory technique, a pipe technique, or a message passing technique, for example. FIG. 2B depicts memory 28 after the completion of the allocation described above, such that pages 282 have been transferred to hoarded memory 262 of cooperative memory allocator 253. Cooperative memory allocator 253 can thus service the new request for memory made previously by process 252.

Figure 3A:
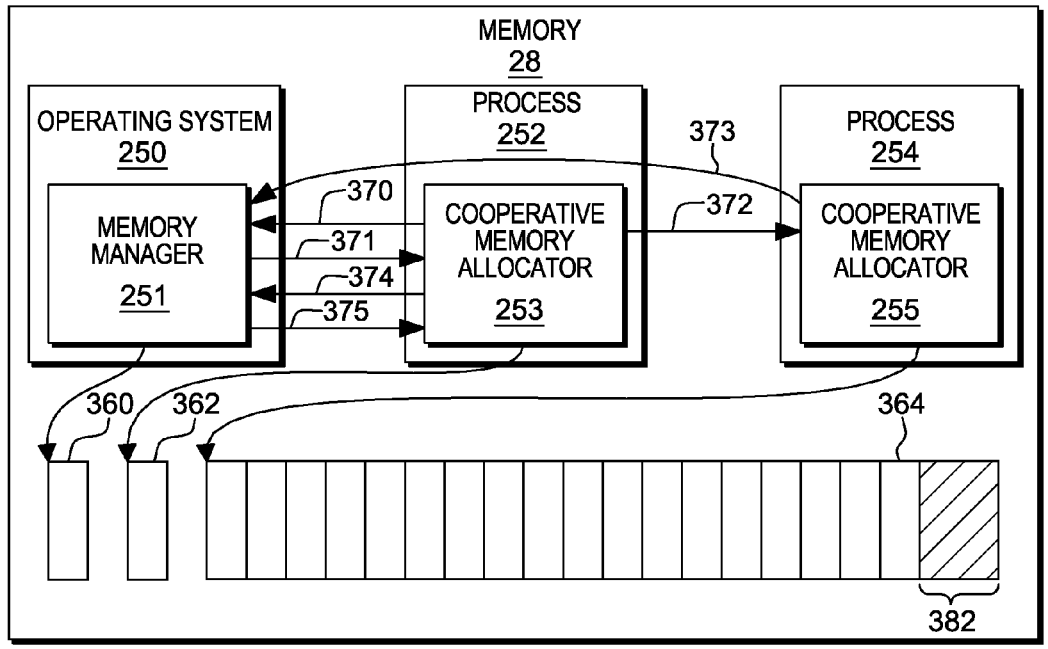
FIGS. 3A and 3B are functional block diagrams of another aspect of the memory of FIGS. 2A and 2B that stores free memory managed by an operating system and hoarded memory associated with two processes, in accordance with an embodiment of the present invention.
Figure 3B:
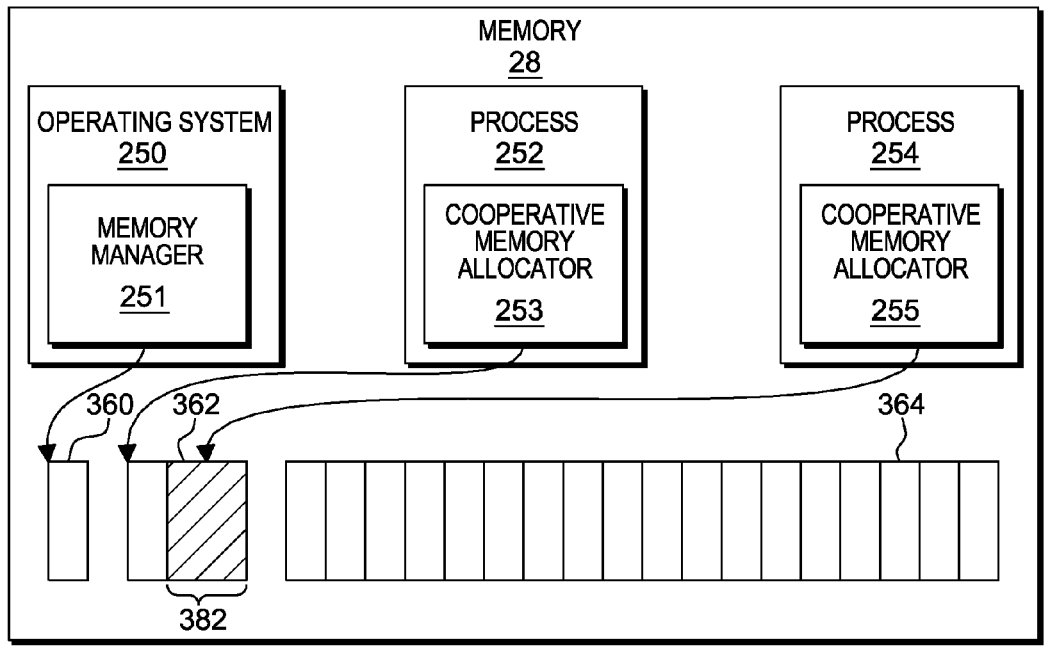

Referring now to FIGS. 3A and 3B, functional block diagrams are shown of another aspect of memory 28 that stores free memory managed by an operating system and hoarded memory associated with two processes, in accordance with an embodiment of the present invention. In particular, FIG. 3A shows memory 28 that stores free memory 360, hoarded memory 362, and hoarded memory 364. In contrast with the state of affairs depicted in FIG. 2A, in FIG. 3A, memory manager 251 has much less free memory available for allocation, and cooperative memory allocator 255 of process 254 has hoarded much more memory in hoarded memory 364.

As stated above, cooperative memory allocators 253 and 255 are able to satisfy certain memory allocation requests from within their respective processes 252 and 254 from their respective hoarded memories 262 and 264, without the assistance of memory manager 251. For example, in one embodiment, cooperative memory allocator 253 avails itself of cooperative memory allocator 255. As shown in FIG. 3A, cooperative memory allocator 253 has one page of memory in hoarded memory 362. If process 252 makes a new request for memory that cooperative memory allocator 253 cannot satisfy by the single page of memory in hoarded memory 362, then cooperative memory allocator 253 can send first request 370 to memory manager 251, requesting additional pages of memory to satisfy the new request for memory. For example, if process 252 needs three pages of memory to store a new data structure, then cooperative memory allocator 253 can request two pages of memory from memory manager 251.

In response to first request 370, memory manager 251 cannot release two pages of memory to cooperative memory allocator 253, because free memory 360 includes only one page. As such, memory manager 251 sends first response 371 to cooperative memory allocator 253, informing cooperative memory allocator 253 of the failure to satisfy first request 370. In turn, cooperative memory allocator 253 sends second request 372 to cooperative memory allocator 255, requesting two pages of memory.

In response to second request 372, cooperative memory allocator 255 releases pages 382 and sends second response 373 to memory manager 251, informing memory manager 251, of the location of pages 382. Pages 382 are thus transferred to free memory 360 of memory manager 251, and memory manager 251 is able to satisfy a larger request for memory.

Having sent out first request 370 and then second request 372, cooperative memory allocator 253 can then send third request 374 to memory manager 251, again requesting two pages of memory to satisfy the new request for memory. Cooperative memory allocator 253 can send third request 374 in a variety of ways. For example, in one embodiment, cooperative memory allocator 253 can send third request 374 after waiting a predetermined amount of time after sending second request 372. The predetermined amount of time can be a fixed amount of time, for example, or can be an amount of time determined based upon an estimate made by cooperative memory allocator 253 of how long it will take cooperative memory allocator 255 to send second response 373 to memory manager 251. In another embodiment, cooperative memory allocator 253 can send third request 374 responsive to receiving a notification (not shown) directly from cooperative memory allocator 255, notifying it that second response 373 was sent to memory manager 251.

In response to third request 374, memory manager 251 releases pages 382 and sends third response 375 to cooperative memory allocator 253, informing cooperative memory allocator 253 of the location of pages 382. FIG. 3B depicts memory 28 after the completion of the allocation described above, such that pages 382 have been transferred to hoarded memory 362 of cooperative memory allocator 253. Cooperative memory allocator 253 can thus service the new request for memory made previously by process 252.

In an embodiment described above, first request and response 370 and 371, as well as third request and response 374 and 375, are communications between cooperative memory allocator 253 and memory manager 251. However, second request and response 372 and 373 are communications between all three of memory manager 251, cooperative memory allocator 253, and cooperative memory allocator 255. In another embodiment, the necessity for making third request and response 374 and 375 is avoided by altering second response 373 to be a direct response from cooperative memory allocator 255 to cooperative memory allocator 253. In such an embodiment, only first request and response 370 and 371 and second request and response 372 and 373 are necessary, and pages 382 are transferred from cooperative memory allocator 255 to cooperative memory allocator 253 without the involvement of memory manager 251.

In another embodiment, the new request for memory made by process 252 to cooperative memory allocator 253 can be satisfied from multiple sources. For example, if the new request for memory requires two pages to be satisfied, then memory manager 251 can provide one page, and cooperative memory allocator 255 can provide another page, according to the techniques described above in the context of FIGS. 2A and 3A.

In another embodiment, the new request for memory made by process 252 to cooperative memory allocator 253 can be satisfied by multiple additional cooperative memory allocators. For example, if the new request for memory requires two pages to be satisfied, and memory manager 251 cannot provide any pages, and cooperative memory allocator 255 can provide only one page, then a third cooperative memory allocator (not shown) of a third process (not shown) can provide another page, according to the techniques described above in the context of FIG. 3A. In such an embodiment, second request 372 can be a multicast message sent both to cooperative memory allocator 255 and to the third cooperative memory allocator. Alternatively, second request 372 can be sent directly to cooperative memory allocator 255 and another request can be sent directly to the third cooperative memory allocator.

In another embodiment, second request 372 received by cooperative memory allocator 255 can be received from a source besides cooperative memory allocator 253. For example, in one embodiment, second request 372 can be received from a system timer or an internal timer, which indicates to cooperative memory allocator 253 that it is time to release some of hoarded memory 364 back to memory manager 251, regardless of the state of process 252 or operating system 250. In another embodiment, second request 372 can be received memory manager 251, if memory manager 251 requires more memory in free memory 360.

As discussed above, cooperative memory allocator 253 can send second request 372 to cooperative memory allocator 255, requesting two pages of memory. Thus, in one embodiment, second request 372 includes a requests amount of memory. Alternatively, in another embodiment, second request 372 can be a more simple request, which communicates to cooperative memory allocator 255 only that another process is in need of memory (without specifying a requested amount). In such an embodiment, cooperative memory allocator 255 can respond by releasing a predetermined amount of memory, according to a heuristic, and notifying memory manager 251 of this via second response 373. For example, a first heuristic requires cooperative memory allocator 255 to always release a fixed number of hoarded pages (for example, one page). A second heuristic requires cooperative memory allocator 255 to always release all hoarded pages. A third heuristic requires cooperative memory allocator 255 to release a fixed percentage of its hoarded pages (for example, half of its hoarded pages). Using this third heuristic, in the case of FIG. 3A, cooperative memory allocator 255 would release 10 of its 20 hoarded pages in hoarded memory 364 upon receiving second request 372. Upon receiving another request (not shown), cooperative memory allocator 255 would release five of its 10 remaining hoarded pages.

Figure 4:
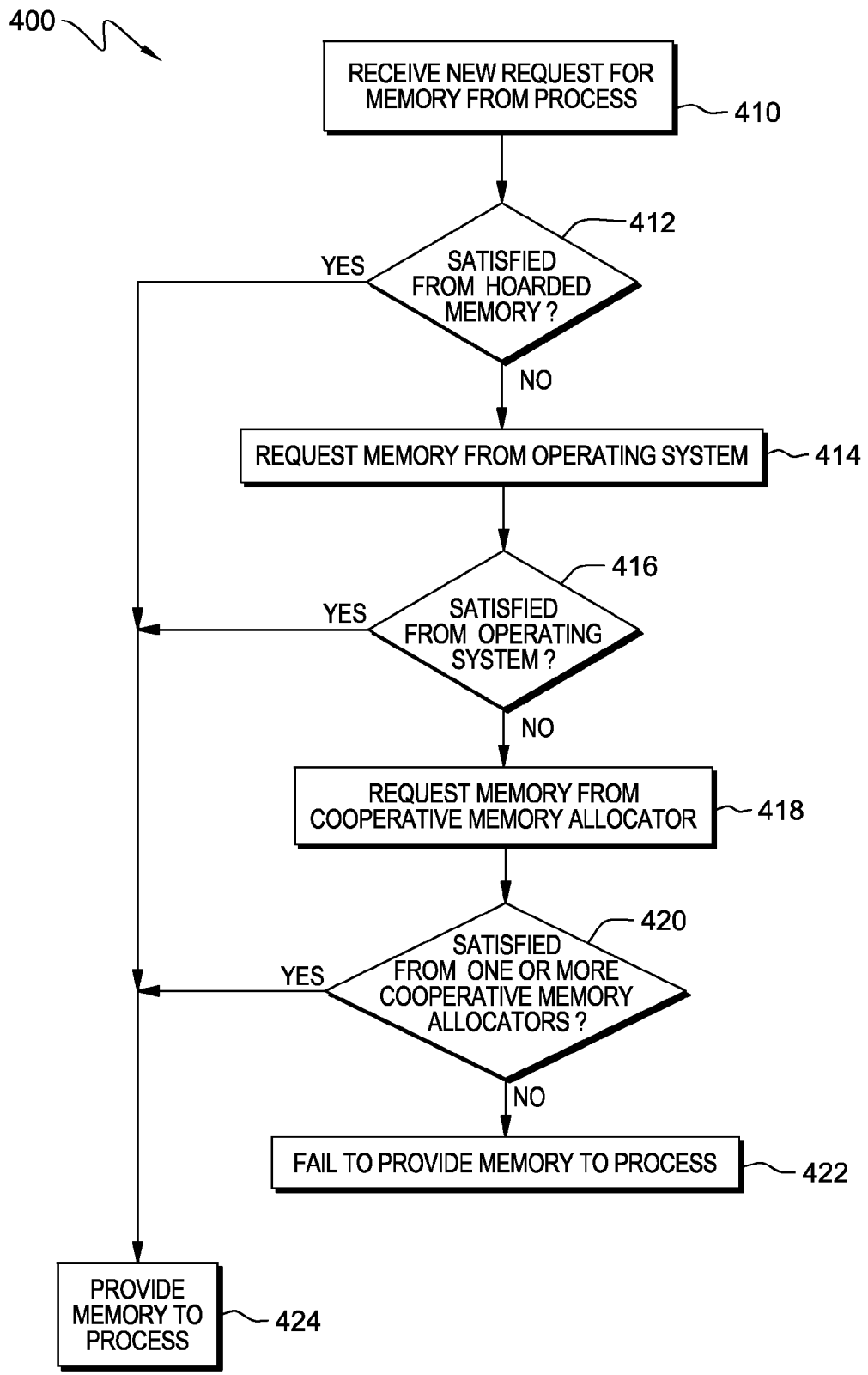
FIG. 4 is a flowchart depicting steps followed by a cooperative memory allocator attempting to satisfy a request for memory in accordance with an embodiment of the present invention.

Referring now to FIG. 4, flowchart 400 is shown depicting steps followed by a cooperative memory allocator, such as cooperative memory allocator 253, in attempting to satisfy a request for memory, in accordance with an embodiment of the present invention. In step 410, cooperative memory allocator 253 receives a new request for memory from process 252. For example, process 252 requires the new memory to create a data structure.

In decision 412, cooperative memory allocator 253 attempts to satisfy the new request for memory utilizing memory from hoarded memory 362. If the new request for memory can be satisfied from hoarded memory 362, then cooperative memory allocator 253 terminates in step 424 after providing the requested memory to process 252. If the new request for memory cannot be satisfied from hoarded memory 362, then in step 414 cooperative memory allocator 253 requests memory from memory manager 251 of operating system 250.

In decision 416, cooperative memory allocator 253 attempts to satisfy the new request for memory utilizing memory from memory manager 251. If the new request for memory can be satisfied from memory manager 251, then cooperative memory allocator 253 terminates in step 424 after providing the requested memory to process 252. If the new request for memory cannot be satisfied from memory manager 251, then in step 418 cooperative memory allocator 253 requests memory from cooperative memory allocator 255 of process 254.

In decision 420, cooperative memory allocator 253 attempts to satisfy the new request for memory utilizing memory from one or more cooperative memory allocators, including cooperative memory allocator 255. For example, the memory can be received directly from cooperative memory allocator 255, or indirectly via memory manager 251 of operating system 250. If the new request for memory can be satisfied from cooperative memory allocator 255, then cooperative memory allocator 253 terminates in step 424, after providing the requested memory to process 252. If the new request for memory cannot be satisfied from cooperative memory allocator 255, then cooperative memory allocator 253 terminates in step 422, after failing to provide the requested memory to process 252.

Figure 5:
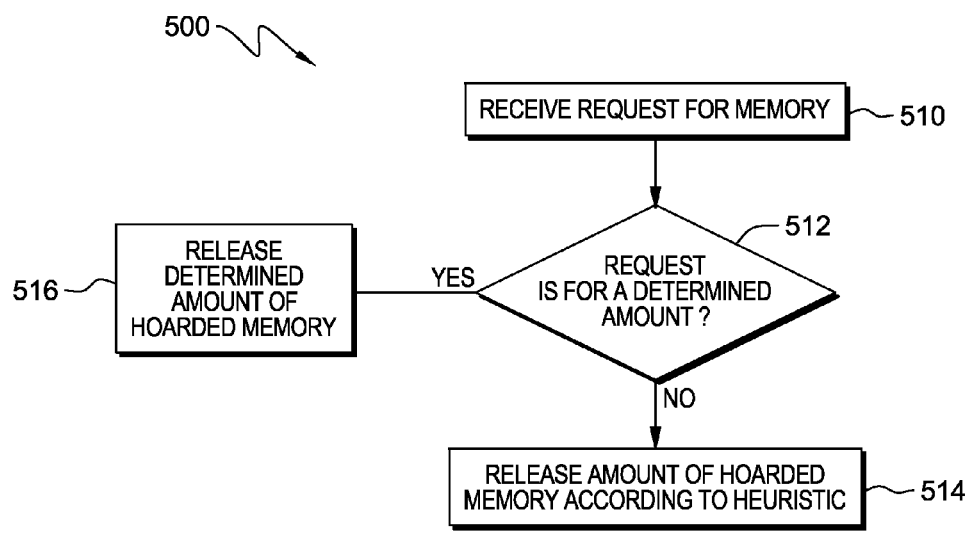
FIG. 5 is a flowchart depicting steps followed by a cooperative memory allocator attempting to release hoarded memory in accordance with an embodiment of the present invention.

Referring now to FIG. 5, flowchart 500 is shown depicting steps followed by a cooperative memory allocator attempting to release hoarded memory in accordance with an embodiment of the present invention. In step 510, cooperative memory allocator 255 receives a request for memory. For example, in one embodiment the request for memory is received from cooperative memory allocator 253. In another embodiment, the request for memory is received from memory manager 251, from a timer, or from another source, as discussed above.

In decision 512, cooperative memory allocator 255 determines whether the request for memory is for a determined amount of memory, such as two pages, for example. If so, then in step 516 cooperative memory allocator 255 releases the determined amount of hoarded memory to memory manager 251. In another embodiment, in step 516 cooperative memory allocator 255 releases the determined amount of hoarded memory directly to the requestor (for example, directly to cooperative memory allocator 253). If not, then in step 514 cooperative memory allocator 255 releases an amount of hoarded memory to memory manager 251, or to another destination, according to a heuristic, as discussed above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Various other embodiments may be within the scope of the following claims even if described using other terminology.

What is claimed is:

1. A method for cooperative allocation of memory, the method comprising the steps of:
    sending, by a first process executing on a computer, a first request to release memory, wherein (i) the first request is directly sent from the first process to a second process executing on the computer, and (ii) the first request to release memory includes an amount of memory for allocation to the first process;
    determining, by the second process, an amount of hoarded memory allocated to the second process; and
    responsive to the amount of hoarded memory allocated to the second process being able to satisfy the amount of memory for allocation to the first process in the first request to release memory, releasing, by the second process, the hoarded memory allocated to the second process equal to the amount of memory for allocation to the first process in the first request to release memory, wherein the second process releases the hoarded memory directly to the first process.

2. The method of claim 1, wherein the amount of hoarded memory allocated to the second process is currently not in use by the second process and not free memory of a memory manager of an operating system.

3. The method of claim 1, the method further comprising:
    responsive to the amount of hoarded memory allocated to the second process not being able to satisfy the amount of memory for allocation to the first process in the first request to release memory, releasing, by the second process, all of the hoarded memory previously allocated to the second process; and
    sending, by the first process executing on a computer, a second request to release memory directly to a third process executing on the computer, wherein the second request to release memory includes a remaining amount of memory for allocation to the first process.

4. The method of claim 1, the method further comprising:
    sending, by the first process executing on a computer, a second request to release memory directly to a third process executing on the computer, wherein the second request to release memory does not include a specified amount; and
    releasing, by the third process, an amount of hoarded memory allocated to the third process, wherein the released amount of hoarded memory allocated to the third process is based, at least in part, on one of the following: (i) a fixed number of pages allocated to the third process; (ii) all pages allocated to the third process; or (iii) a fixed percentage of pages allocated to the third process.

5. The method of claim 1, wherein an amount of hoarded memory of the first process is less than the amount of memory for allocation to the first process.

6. The method of claim 5, the method further comprising:
    allocating, by the first process, the amount of hoarded memory of the first process to the first process.

7. The method of claim 6, wherein the first request includes the remaining portion of the amount of memory for allocation to the first process not allocated from the hoarded memory of the first process.

8. A computer program product for cooperative allocation of memory, the computer program product comprising:
    one or more computer-readable storage media and program instructions stored on the one or more computer-readable storage media, the program instructions comprising:
    program instructions to send, by a first process executing on a computer, a first request to release memory, wherein (i) the first request is directly sent from the first process to a second process executing on the computer, and (ii) the first request to release memory includes an amount of memory for allocation to the first process;
    program instructions to determine, by the second process, an amount of hoarded memory allocated to the second process; and
    responsive to the amount of hoarded memory allocated to the second process being able to satisfy the amount of memory for allocation to the first process in the first request to release memory, program instructions to release, by the second process, the hoarded memory allocated to the second process equal to the amount of memory for allocation to the first process in the first request to release memory, wherein the second process releases the hoarded memory directly to the first process.

9. The computer program product of claim 8, wherein the amount of hoarded memory allocated to the second process is currently not in use by the second process and not free memory of a memory manager of an operating system.

10. The computer program product of claim 8, the program instructions further comprising:
    responsive to the amount of hoarded memory allocated to the second process not being able to satisfy the amount of memory for allocation to the first process in the first request to release memory, program instructions to release, by the second process, all of the hoarded memory previously allocated to the second process; and
    program instructions to send, by the first process executing on a computer, a second request to release memory directly to a third process executing on the computer, wherein the second request to release memory includes a remaining amount of memory for allocation to the first process.

11. The computer program product of claim 8, the program instructions further comprising:
    program instructions to send, by the first process executing on a computer, a second request to release memory directly to a third process executing on the computer, wherein the second request to release memory does not include a specified amount; and
    program instructions to release, by the third process, an amount of hoarded memory allocated to the third process, wherein the released amount of hoarded memory allocated to the third process is based, at least in part, on one of the following: (i) a fixed number of pages allocated to the third process; (ii) all pages allocated to the third process; or (iii) a fixed percentage of pages allocated to the third process.

12. The computer program product of claim 8, wherein an amount of hoarded memory of the first process is less than the amount of memory for allocation to the first process.

13. The computer program product of claim 12, the program instructions further comprising:
   program instructions to allocate, by the first process, the amount of hoarded memory of the first process to the first process.

14. The computer program product of claim 13, wherein the first request includes the remaining portion of the amount of memory for allocation to the first process not allocated from the hoarded memory of the first process.

15. A computer system for cooperative allocation of memory, the computer system comprising:
   one or more computer processors;
   one or more computer readable storage media; and
   program instructions stored on the computer readable storage media for execution by at least one of the one or more processors, the program instructions comprising:
      program instructions to send, by a first process executing on a computer, a first request to release memory, wherein (i) the first request is directly sent from the first process to a second process executing on the computer, and (ii) the first request to release memory includes an amount of memory for allocation to the first process;
      program instructions to determine, by the second process, an amount of hoarded memory allocated to the second process; and
      responsive to the amount of hoarded memory allocated to the second process being able to satisfy the amount of memory for allocation to the first process in the first request to release memory, program instructions to release, by the second process, the hoarded memory allocated to the second process equal to the amount of memory for allocation to the first process in the first request to release memory, wherein the second process releases the hoarded memory directly to the first process.

16. The computer system of claim 15, the program instructions further comprising:
   responsive to the amount of hoarded memory allocated to the second process not being able to satisfy the amount of memory for allocation to the first process in the first request to release memory, program instructions to release, by the second process, all of the hoarded memory previously allocated to the second process; and
   program instructions to send, by the first process executing on a computer, a second request to release memory directly to a third process executing on the computer, wherein the second request to release memory includes a remaining amount of memory for allocation to the first process.

17. The computer system of claim 15, the program instructions further comprising:
   program instructions to send, by the first process executing on a computer, a second request to release memory directly to a third process executing on the computer, wherein the second request to release memory does not include a specified amount; and
   program instructions to release, by the third process, an amount of hoarded memory allocated to the third process, wherein the released amount of hoarded memory allocated to the third process is based, at least in part, on one of the following: (i) a fixed number of pages allocated to the third process; (ii) all pages allocated to the third process; or (iii) a fixed percentage of pages allocated to the third process.

18. The computer system of claim 15, wherein an amount of hoarded memory of the first process is less than the amount of memory for allocation to the first process.

19. The computer system of claim 18, the program instructions further comprising:
   program instructions to allocate, by the first process, the amount of hoarded memory of the first process to the first process.

20. The computer system of claim 19, wherein the first request includes the remaining portion of the amount of memory for allocation to the first process not allocated from the hoarded memory of the first process.

* * * * *